July 10, 1951 J. C. TELLIER 2,560,313
MANUAL TUNING SYSTEM FOR RADIO RECEIVERS
Filed Nov. 15, 1947
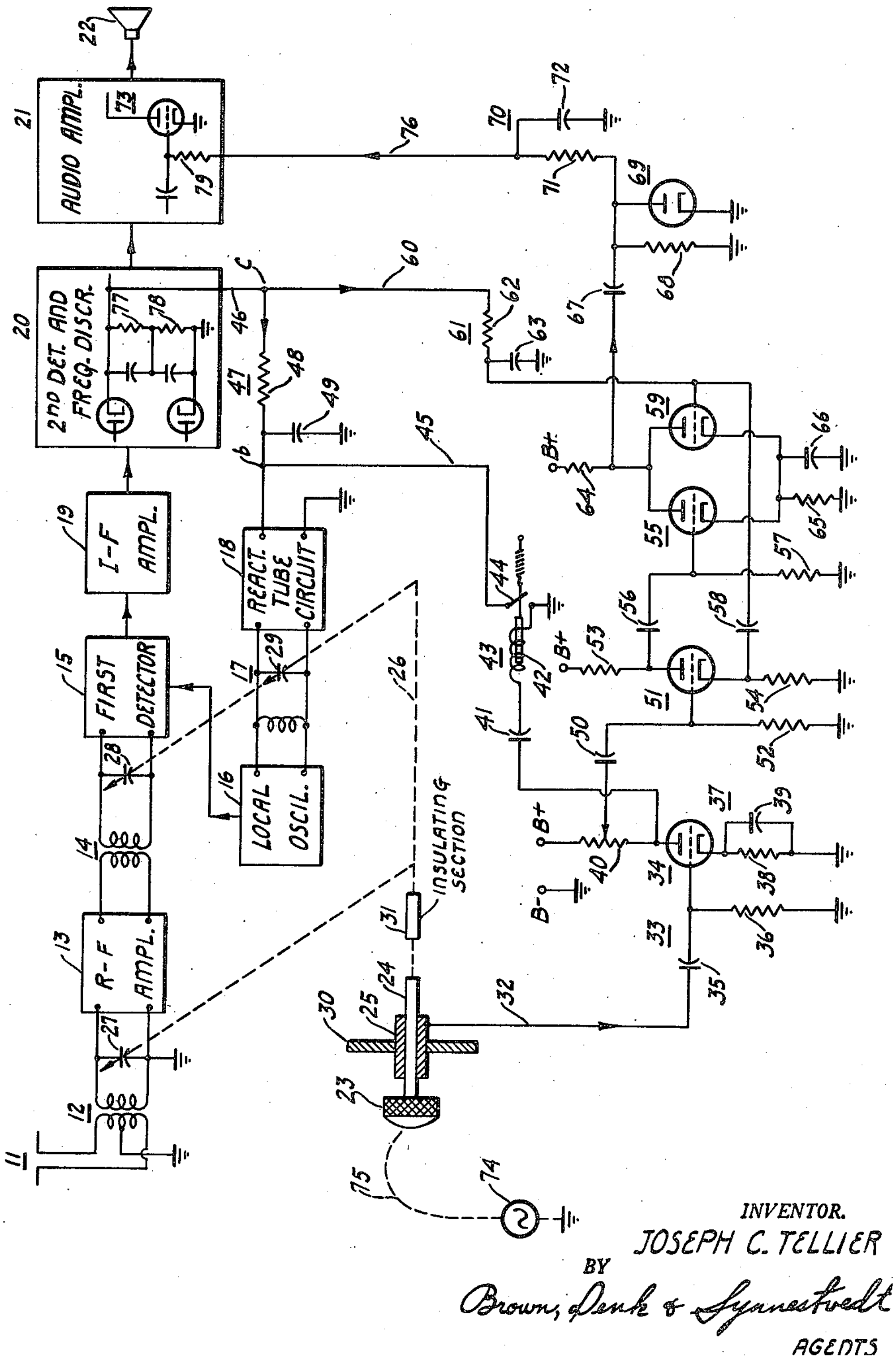
INVENTOR.
JOSEPH C. TELLIER
BY
Brown, Denk & Synnestvedt
AGENTS Patented July 10, 1951 2,560,313

UNITED STATES PATENT OFFICE 2,560,313

MANUAL TUNING SYSTEM FOR RADIO RECEIVERS

Joseph C. Tellier, Penn Wynne, Pa., assignor to Philco Corporation, Philadelphia, Pa., a corporation of Pennsylvania Application November 15, 1947, Serial No. 786,187

9 Claims. (Cl. 250—20)

The invention herein described and claimed relates to improvements in the manual tuning of radio receivers and is applicable to both amplitude-modulation and frequency-modulation receivers. More particularly, the invention provides a new and improved muting system whose function is to assist the operator to manually tune the receiver substantially exactly to the frequency of the carrier wave.

The means provided by the present invention are effective to mute the receiver only during manual tuning, and only at those times, during manual tuning, when the receiver is detuned from the carrier frequency. By a suitable selection of circuit constants, the departure from carrier frequency, required to effect silencing, may be very small. It will be understood that the term carrier frequency, as used in this specification, refers, in the case of frequency-modulation receivers, to the unmodulated or center frequency of the frequency-modulated wave.

The operation of the muting means of the present invention is entirely automatic in that the operator is only required to perform those manual acts which are performed in any event during conventional manual tuning.

The invention utilizes potentials which are available in the electrostatic fields inherently established by electric power lines located in the vicinity of the receiver. These electrostatic potentials are so applied to the receiver, through the agency of the operator in carrying out the ordinary manual-tuning operation, that the audio amplifier stage of the receiver is disabled when, during manual tuning, the receiver is detuned from the carrier frequency.

It is not improbable that the radio receiver, to be muted by means of the present invention, includes an automatic-frequency-control (AFC) system. If so, and if the AFC system be permitted to function during manual tuning, the AFC action will tend to hold the local oscillator of the receiver at a substantially fixed frequency over a rather considerable tuning range on either side of the optimum tuning point. Consequently, the receiver will appear to tune much more broadly than would be the case if the AFC system were disabled during manual tuning. Moreover, in tuning a receiver whose AFC system is operative, there is increased likelihood of passing over the weaker signals, since the AFC system acts to lock-in the receiver on only the stronger carrier waves.

To avoid the difficulties recited above, it is desirable, in a receiver having an AFC system, to provide means for disabling the said system during manual tuning. And, as will become clear, this is particularly desirable in the case of receivers which include the improved muting means of the present invention.

In view of the above, the present invention contemplates the provision, in combination with the improved muting means, of means for disabling automatically the AFC system of the receiver during manual tuning. The AFC-system-disabling means are preferably, though not necessarily, responsive to the voltage hereinbefore referred to, which is derived from the ambient electric fields of electric power circuits located in the vicinity of the receiver. Such AFC-system-disabling means are described and claimed in my copending application, Serial No. 777,826, filed October 3, 1947, and assigned to the assignee of the present invention.

While the means provided by the present invention are employable in amplitude-modulation receivers, as well as in frequency-modulation receivers, the advantages to be derived are particularly good in the case of frequency-modulation receivers. For, in such receivers, if the incoming signal wave is characterized by relatively low modulation, the audio output of the receiver will sound substantially the same over a wide tuning range. And, if the receiver be permitted to remain tuned to a point within that range which is substantially different from the center frequency of the carrier, then when the modulation of the signal wave increases, the linear range of the detector may be exceeded and objectionable distortion caused, or, if the detector be of a lock-in type, the detector may break out of synchronism. Such a situation is avoided, when the present invention is employed, since the operator is required to tune substantially exactly to the carrier frequency; at adjacent frequencies, the receiver is muted.

It is an object of this invention to provide improved means, in a radio receiver, adapted to assist the operator in tuning manually to the exact frequency of the incoming carrier wave.

It is another object of this invention to provide improved means for muting automatically the audio output system of a receiver when, during manual tuning, the receiver is detuned from the carrier frequency.

It is another object of this invention to provide, in combination, means for muting automatically the audio output system of a radio receiver when, during manual-tuning, the receiver is detuned from the carrier frequency, and means for disabling the automatic-frequency-control (AFC) system of the receiver during the manual tuning operation.

It is a feature of a preferred embodiment of this invention that means are provided for utilizing the electric potentials of electrostatic fields, inherently established by electric power lines located in the vicinity of a radio receiver, to mute the audio output system of the receiver when, during manual tuning, the receiver is detuned from the unmodulated frequency of the carrier wave, and to render the automatic-frequency-control (AFC) system of the receiver inoperative during the manual tuning operation.

These and other objects, features and advantages of the present invention, and the manner in which the objects are attained, will become clear from a consideration of the following detailed description and accompanying single figure of drawing showing a preferred embodiment of the invention.

Referring now to the drawing, there is shown a radio receiver comprised of an antenna 11, a tuned antenna transformer 12, a radio-frequency amplifier 13, a tuned R.-F. transformer 14, a first detector stage 15, a local oscillator 16 tunable through the agency of a tank circuit 17, a reactance-tube circuit 18, an intermediate-frequency amplifier 19, a second detector and frequency discriminator 20, and an audio output system comprising an audio amplifier 21 and a loud speaker 22.

As indicated previously, the improvement provided by the present invention is applicable both to frequency-modulation and to amplitude-modulation receivers, and block 20 in the drawing is intended to represent the second detector and frequency discriminator circuits of either a frequency-modulation or amplitude-modulation receiver.

The receiver shown in the drawing includes a manually operable tuning control knob 23 mounted on a drive shaft 24. Drive shaft 24, which may be seated in a suitable bushing member 25, is mechanically coupled to the common shaft 26 on which variable capacitors 27, 28 and 29 are ganged. These capacitors control the tuning of the antenna, radio frequency, and local oscillator stages of the receiver in conventional manner.

In accordance with the present invention, control knob 23, shaft 24 and bushing member 25 are constructed of material which is electrically conductive and these elements are insulated from the chassis, and from other grounded components of the receiver, by means of the insulating bushing-support member 30 and the insulating section 31 of shaft 26. When, as is customary, shaft 24 drives the shaft 26 through the agency of a pulley-and-dial cord arrangement, the dial cord will serve as the insulating section. In other cases, the insulation may be provided by a section interposed between the drive shaft 24 and the driven shaft 26, as is indicated diagrammatically by section 31 in the drawing.

Control knob 23 is connected electrically, by way of drive shaft 24, bushing 25, conductor 32, and network 33, to the control grid of amplifier tube 34. The network 33 may be comprised of a series capacitor 35 and a shunt resistor 36, connected as shown in the drawing. The cathode of tube 34 is connected to ground, either directly or, if desired, through a biasing network 37 comprised of a resistor 38 and a capacitor 39. The plate of tube 34 is connected, by way of plate load resistor 40, to a source of positive potential, B+.

If the receiver, into which the improvement of the present invention is to be incorporated, includes an automatic-frequency-control (AFC) system, as will frequently be the case, the plate circuit of tube 34 may be A.-C. coupled, by way of coupling capacitor 41, to the winding 42 of an alternating-current relay 43. Relay 43 has a normally open switch 44, one contact of which is connected, by way of conductor 45, to the input or control terminal of reactance-tube circuit 18 of the automatic-frequency-control (AFC) system of the receiver. The AFC system includes frequency discriminator 20, conductor 46, filter 47 and reactance-tube circuit 18. Filter 47, comprising series resistor 48 and shunt capacitor 49, constitutes the usual audio filter of the AFC system.

The function of the relay circuit, described in the above paragraph, is to disable the AFC system during manual tuning. The function of the remainder of the circuit of the drawing, about to be described, is to mute the receiver, when during manual tuning, the receiver is detuned from the carrier frequency.

A part of the plate output of amplifier tube 34 is applied, by way of coupling capacitor 50, to the control grid of tube 51. Resistor 52 serves as the usual grid-return resistor or grid leak. Tube 51 functions as a paraphase amplifier, i. e., functions to convert a single-sided input into a push-pull output. This is accomplished, in conventional manner in the circuit of the present invention, by providing an external plate-to-cathode circuit whose total resistance is divided substantially equally between the plate and cathode portions of the circuit. In the drawing, the plate of tube 51 is connected to a source of plate supply voltage, B+, by way of plate load resistor 53, and the cathode of tube 51 is connected to ground by way of a cathode load resistor 54. The values of resistor 53 and resistor 54 are equal, and consequently the amplitude of the voltage developed across plate load resistor 53 is substantially equal to that developed across cathode load resistor 54. The alternating voltages developed at the plate and cathode electrodes of triode 51 are, of course, of opposite polarity or phase.

The plate of paraphase-amplifier tube 51 is coupled to the grid of amplifier tube 55 by way of coupling capacitor 56; resistor 57 functions as the usual grid leak. The cathode of paraphase-amplifier tube 51 is coupled, by way of coupling capacitor 58, to the grid of amplifier tube 59. Resistors 62, 77 and 78 provide the necessary grid return, resistors 77 and 78 being a part of the output network of frequency discriminator 20.

In the circuit of the drawing, the source of AFC bias, i. e., frequency-discriminator 20, is coupled, by way of audio filter 47, to reactance-tube circuit 18. and is also coupled, by way of a conductor 60 and an audio filter 61, to the grid of tube 59. Filter 61 is an audio filter comprising a series resistor 62 and a shunt capacitor 63.

In accordance with the present invention, the pertinent circuit constants are so chosen that the two tubes, 55 and 59, are equally biased when the receiver is correctly tuned to the carrier frequency. It will be understood that when the receiver is correctly tuned, the developed discriminator bias has a direct-current component of zero volts. Under this condition, the grids of both triodes 55 and 59 are equally biased, both being returned effectively to ground or chassis potential. Therefore, when alternating voltages of equal amplitude and opposite polarity are applied to the two grids, the alternating components of the plate currents in both tubes will also be substantially equal in amplitude and opposite in polarity. In the drawing, tubes 55 and 59 are shown to be equally biased by a common cathode biasing network, comprising resistor 65 and capacitor 66, but it will be understood that other forms of bias may be employed.

The plates of amplifier tubes 55 and 59 are connected, by way of a common load resistor 64, to a common source of plate supply voltage, B+. The plates of tubes 55 and 59 are also connected, by way of an RC network comprising series capacitor 67 and shunt resistor 68, to the anode of a diode rectifier or detector tube 69. The cathode of diode 69 is connected to ground, as shown.

The anode of diode 69 is connected, by way of a filter 70, conductor 76, and resistor 79 to the grid of the receiver's audio amplifier tube 73. Filter 70 is comprised of a series resistor 71 and a shunt capacitor 72.

The operation of the circuit of the drawing will now be described. I will first describe the operation of that portion of the circuit whose function is to disable the AFC system of the receiver during manual tuning. This portion of the circuit is similar to the AFC-system-disabling means shown in Figure 1 of my previously mentioned copending application, Serial No. 777,826, filed October 3, 1947.

When, with the intention ordinarily of manually tuning the receiver, the operator places his hand upon control knob 23, he automatically applies to knob 23 a potential which is derived from the ambient electric fields established by electric power circuits located in the vicinity of the receiver. The body of the operator, being exposed to the aforesaid electric fields, functions as an antenna and acquires a potential which is different from that of the radio receiver; and this difference in potential, between the operator and the receiver, is automatically applied to knob 23 when the knob is touched by the operator. The operator may therefore be considered as a source of alternating voltage, the frequency of which corresponds to the frequency of the power circuits from which the voltage is derived. In the drawing, the operator, as a source of alternating voltage, is represented diagrammatically by the voltage source 74.

When the hand of the operator contacts knob 23, as is indicated in the drawing by the dotted line 75, the alternating voltage represented by source 74 is applied to the control grid of amplifier tube 34 by way of a path comprising knob 23, shaft 24, bushing 25, conductor 32 and network 33. This applied voltage appears in amplified form across winding 42 of A.-C. relay 43. Relay 43, by reason of the current which now flows through its winding 42, is energized and switch 44 closes, thereby shorting to ground the AFC bias appearing across capacitor 49. The closing of switch 44 consequently renders the AFC system of the receiver ineffective; and this condition of ineffectiveness continues so long as the hand of the operator remains in contact with control knob 23.

I will now describe the operation of that portion of the circuit whose function is to mute the receiver when, during the manual tuning operation, the receiver is detuned from the carrier frequency.

As has been described above, when the hand of the operator is in contact with knob 23, an alternating voltage from source 74, which may have a peak amplitude of the order of one volt, is applied to the grid of tube 34 and appears in amplified form in the plate circuit of the tube. The gain of amplifier stage 34 may be of the order of fifty. A tapped portion of this amplified alternating voltage is applied, by way of capacitor 50, to the grid of the paraphase amplifier tube 51, whose gain may be slightly less than unity. In order not to overload tube 51, the tap point on load resistor 40 may be so located that the voltage taken therefrom is of the order of from two to five volts, peak amplitude.

Since the values of load resistors 53 and 54 are equal, the plate and cathode outputs of tube 51 are equal in amplitude and opposite in polarity, and equal and opposite voltages are therefore applied, by way of coupling capacitors 56 and 58, to the grids of tubes 55 and 59.

When no appreciable positive or negative AFC bias is applied to the grid of tube 59, the two tubes, 55 and 59, are equally biased, as previously described, and the alternating components of plate current, in the two tubes, are equal in amplitude and 180 degrees out of phase. Therefore, the combined plate current flowing through common load resistor 64 contains no substantial alternating component, and the alternating voltage developed thereacross is zero. Stated another way, when tubes 55 and 59 are equally biased, the sum of the plate currents in the two tubes, with alternating voltages of equal amplitude and opposite phase applied to the grids, is equal at all times during the alternating cycle, and a steady or direct current flows through load resistor 64. Due to the blocking action of capacitor 67, the direct voltage appearing across resistor 64 is not applied to diode detector 69; hence, no voltage is developed across diode 69 for application, as a muting bias, to the grid of audio amplifier tube 73.

Consider now the effect when a positive or negative AFC bias is developed in frequency-discriminator 20. This bias appears across capacitor 49 of audio filter 47 and across capacitor 63 of audio filter 61. When the hand of the operator is in contact with knob 23, as is the case during manual tuning, the AFC bias appearing across capacitor 49 is zero, by reason of point *b* being connected to ground at switch arm 44, relay 43 being in energized condition, as previously described. Point *c*, on the frequency-discriminator side of audio filter 47, is, however, effectively isolated from point *b* by resistor 48, whose value is large in comparison with the internal resistance of the source of AFC bias. Consequently, audio voltages containing an AFC-bias component appear at point *c*. In brief, the AFC-bias component at point *c* is not reduced in magnitude by the connection to ground at relay switch-arm 44. On the contrary, the AFC-bias component at point *c* is larger than it would have been otherwise; for the connection of point *b* to ground effectively disables the AFC system, and the frequency of the local oscillator 16 is not corrected.

When the receiver is manually detuned from the carrier frequency, an AFC bias is developed across capacitor 63 which is a function of the output voltage-versus-frequency characteristic of the discriminator. This AFC bias, being applied to the grid of tube 59 only, disturbs the balanced condition otherwise obtaining, and tubes 55 and 59 are no longer equally biased.

Since the gain of each tube varies with grid bias, the amplitudes of the out-of-phase alternating components of the plate currents of tubes 55 and 59 are no longer equal. Complete cancellation of the alternating components does not occur, and an alternating voltage is developed across common load resistor 64. This voltage is rectified by diode 69. Diode 69 is so poled that a negative direct-current component is developed on its anode; and this negative D.-C. component is applied, by way of filter 70, conductor 76, and resistor 79 to the grid of audio amplifier tube 73 to cut off the tube and silence the receiver.

If desired, diode 69 may function as a peak detector so as to develop as large a negative D.-C. component as possible. The RC time constant of capacitor 67 and resistor 68 is preferably long in comparison with one cycle of voltage applied thereto but should not be so long as to hold tube 73 cut off after the receiver may be tuned to the carrier frequency.

It will be understood that the muting characteristic, with respect to carrier frequency, may be very narrow, if desired. For the circuit constants of the muting system may be so chosen as to enable a small value of AFC bias to develop, across resistor 64, and alternating voltage of sufficient amplitude to derive a negative D.-C. component sufficient to cut off audio amplifier tube 73. Then, substantially as soon as the operator manually detunes from the carrier frequency, the audio output system of the receiver is muted; and this condition of silence then continues until the receiver is so tuned that the output of the discriminator is again substantially zero, due either to the fact that the receiver is now tuned to the carrier frequency of a second, i. e. different, station, or to the fact that the difference or beat frequency, with respect to the first station, is outside the I.-F. pass band of the receiver.

If the receiver, which is to be muted by the improved means, is an amplitude-modulation receiver which does not include an AFC system, it will be necessary to incorporate a frequency discriminator into the receiver in order to develop a bias which is a function of the tuning of the receiver. If desired, such bias may be utilized only for muting purposes and need not be also utilized as a conventional AFC bias.

It is to be understood that where means for disabling the AFC system are required, or desired, means other than those shown in the drawing may be employed. For example, the means shown in Figure 2 of my previously mentioned copending application, Serial No. 777,826, may be employed, in lieu of those shown in Figure 1 of that application.

It is also to be understood that while the AFC reference value at carrier frequency will ordinarily be zero, the present invention is adaptable to systems employing an AFC reference value other than zero. This will be readily apparent to those skilled in the art.

The improvement provided by the present invention may be incorporated into a receiver which obtains its principal source of power either from alternating-current mains, or from direct-current mains, or from a battery. The requirement, insofar as the present invention is concerned, is that the receiver be located within the ambient electric fields of a power supply line. The supply line will ordinarily carry alternating current. However, if the receiver be located in the vicinity of a direct-current line, rather than an alternating-current line, an alternating voltage will nevertheless be derived by the operator which will be due to commutator ripple in the line voltage. The ripple voltage is ordinarily small compared to the voltage available in an A.-C. system, but this is at least partially compensated or by the fact that the ripple voltage is substantially higher in frequency and the coupling between the line and the operator is correspondingly greater.

It was stated previously hereinabove that the tuning control knob 23 should be constructed of material which is electrically conductive. Any of the usual metals from which receiver components and fittings are ordinarily made will be satisfactory for this purpose. However, if, in accordance with conventional practice, it is preferred to mould the knob from a plastic material, this may be done through suitable choice of an electrically-conducting plastic material, of which a number of types are available commercially. In some instances, it may be sufficient to employ an insulated knob having a relatively large conductive core or bushing insert, reliance being placed on the presence of capacity coupling between the hand of the operator and the bushing insert.

It will be seen that I have described novel means for assisting the operator to tune manually to substantially exact carrier frequency. When the receiver is tuned to center frequency a strong audio signal is heard. However, as the receiver is tuned away from center frequency the audio diminishes very rapidly and then disappears completely.

With my improved manaul tuning aid, the demands placed upon the AFC system of the receiver are very substantially reduced; and when, upon completion of manual tuning, the hand of the operator is removed from knob 23 and AFC bias is restored, the receiver will be very accurately tuned.

Having described my invention, I claim:

1. In a radio receiver having a chassis and an automatic-frequency-control system for developing and utilizing a bias for automatic-frequency-control purposes, said receiver being adapted for use in the vicinity of electric power circuits and within the ambient electric fields which inherently surround said power circuits; a control element intended to be contacted manually by the operator during manual tuning of said receiver, at least a portion of said control element being conductive and insulated from said chassis; means responsive to potentials of said ambient electric fields inherently applied to said control element when said receiver is within said fields and said control element is manually contacted for developing a tuning-aid voltage within said receiver during said period of manual contact; means effective during manual contact of said control element for preventing utilization of said developed bias for frequency-control purposes during the period that said control element is manually contacted; and means responsive to said tuning-aid voltage for muting said receiver during the period of manual contact of said control element when, and so long as, said receiver is so tuned that the bias developed by said automatic-frequency-control system is different from a selected reference value.

2. The combination claimed in claim 1 characterized by the fact that said means for preventing utilization of said developed bias for frequency-control purposes is also responsive to said tuning-aid voltage.

3. The combination claimed in claim 1 characterized by the fact that said selected reference value is zero.

4. The combination claimed in claim 2 characterized by the fact that said selecte reference value is zero.

5. In a radio receiver having a chassis and an automatic-frequency-control system for developing and utilizing a bias for automatic-frequency-control purposes, said receiver being adapted for use in the vicinity of electric power circuits and within the ambient electric fields which inherently surround said power circuits; a control element intended to be contacted manually by the operator during manual tuning of said receiver, at least a portion of said control element being conductive and insulated from said chassis; means responsive to potentials of said ambient electric fields inherently applied to said control element when said receiver is within said fields and said control element is manually contacted for developing a tuning-aid voltage within said receiver during said period of manual contact; means effective during manual contact of said control element for preventing utilization of said developed bias for frequency-control purposes during the period that said control element is manually contacted; and means responsive both to said tuning-aid voltage and to said developed bias for muting said receiver during the period of said manual contact of said control element when, and so long as, said receiver is so tuned that said developed bias is different from a selected reference value.

6. The combination claimed in claim 5 characterized by the fact that said means for preventing utilization of said bias for frequency-control purposes is responsive to said tuning-aid voltage.

7. The combination claimed in claim 5 characterized by the fact that said reference value is zero.

8. The combination claimed in claim 6 characterized by the fact that said reference value is zero.

9. In a radio receiver having a chassis and having an automatic-frequency-control system for developing and utilizing a bias for automatic-frequency-control purposes, said receiver being adapted for use in the vicinity of electric power circuits and within the ambient electric fields which inherently surround said power circuits; manual control means, at least a portion of said control means being electrically conductive; means for insulating said conductive portion of said control means from said chassis; means responsive to potentials of said ambient electric fields inherently applied to said control means when said receiver is within said fields and said control means is manually contacted for rendering the utilization portion of said automatic-frequency-control system ineffective during the time said control means is manually contacted, thus to prevent the utilization of said developed bias for frequency-control purposes; and means effective during the time said control means is manually contacted and responsive both to said inherently applied potentials and to said developed bias for muting said receiver when and so long as said receiver is so tuned that said developed bias is substantially different from a selected reference value indicative of correct tuning.

JOSEPH C. TELLIER.

REFERENCES CITED

The following references are of record in the file of this patent:

UNITED STATES PATENTS

| Number | Name | Date |
|---|---|---|
| 2,174,641 | Sinninger | Oct. 3, 1939 |
| 2,186,099 | Cutting et al. | Jan. 6, 1940 |
| 2,186,825 | Dome | Jan. 9, 1940 |
| 2,264,019 | Case | Nov. 25, 1941 |
| 2,331,039 | Mitchell | Oct. 5, 1943 |
| 2,371,397 | Koch | Mar. 13, 1945 |

FOREIGN PATENTS

| Number | Country | Date |
|---|---|---|
| 453,858 | Great Britain | Sept. 21, 1936 |
| 494,734 | Great Britain | Oct. 31, 1938 |